Jan. 18, 1949.  E. C. RANEY  2,459,337
LIQUID COOLER INCLUDING CONTROL APPARATUS
FOR LIMITING ICE FORMATION THEREON
Filed June 1, 1945
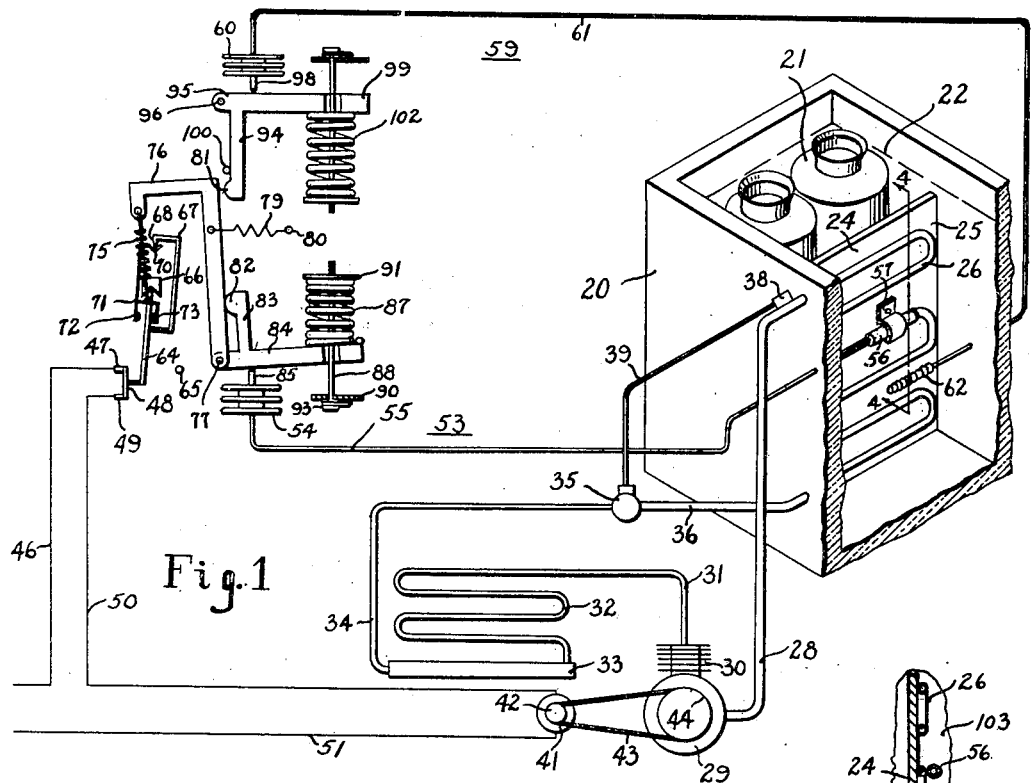
Fig. 1
Fig. 4
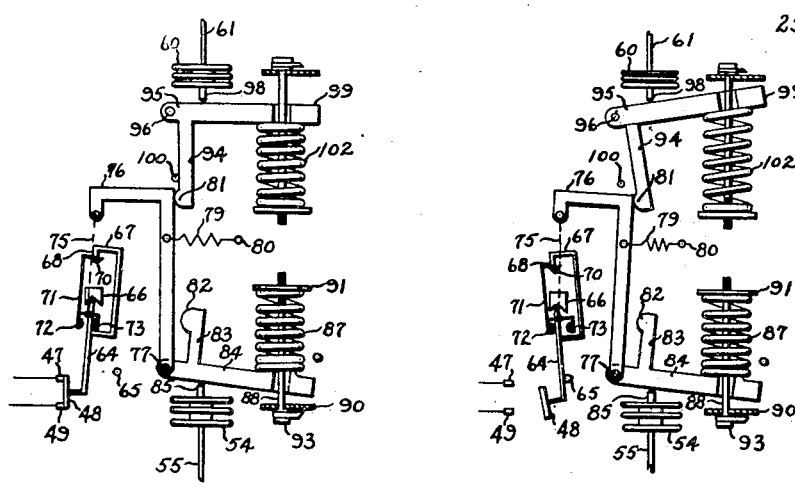
Fig. 2
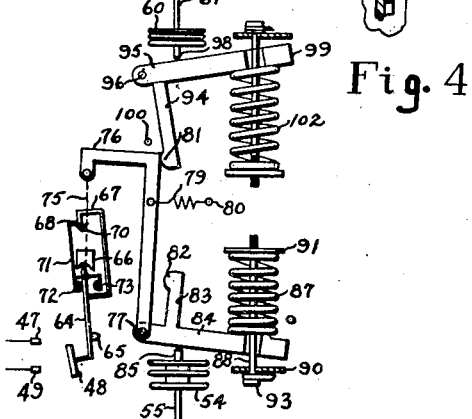
Fig. 3
INVENTOR
ESTEL C. RANEY
BY
*Warren W. F. Schmieding*
ATTORNEY

UNITED STATES PATENT OFFICE 2,459,337

LIQUID COOLER INCLUDING CONTROL APPARATUS FOR LIMITING ICE FORMATION THEREON

Estel C. Raney, Delaware, Ohio, assignor to Ranco Incorporated, Columbus, Ohio, a corporation of Ohio Application June 1, 1945, Serial No. 597,040

4 Claims. (Cl. 62—7)

The present invention relates to refrigerating apparatus and more particularly to the method of control and control mechanism for forming and maintaining an ice bank in a tank of liquid.

One of the objects of the present invention is to provide a method of and apparatus for control for a refrigerating system having a heat absorber for cooling water in a storage tank of the type used, as for example, in milk coolers or drinking water coolers, which method comprises establishing temperature variation cycles in the heat absorber, while the temperature of the liquid in the tank is below a certain temperature, consisting of cooling and warming phases. The temperature of the absorber is maintained below the freezing point of the liquid in the tank so as to freeze an ice bank about the heat absorber. When water is employed in the tank, and under the most favorable conditions, the cooling phase of the heat absorber is started when the temperature of the heat absorber attains approximately 28° F. and ceases when the temperature of the evaporator is reduced to approximately 25° F.; the warming phase continues during the period that the heat absorber temperature rises from 25° to 28°. However, if the ice bank diminishes to a certain amount, as for example, when a large quantity of milk cans are placed in the liquid or if water is consumed in large quantities, the method includes causing the cooling phase to be extended and continued until the desirable ice bank is re-established.

Another object of the present invention is to provide control apparatus for a refrigerating system of the type described above, in which the apparatus responds solely to the temperature of the heat absorber to initiate a cooling phase of the heat absorber when the temperature of the heat absorber has risen to a point slightly below the melting point of ice, and to terminate the cooling phase when the heat absorber has reached a lower predetermined temperature while a predetermined amount of ice is formed about the heat absorber, said control apparatus also being responsive to a temperature, approximating the freezing temperature of the liquid, at a point slightly spaced from the absorber and within the liquid, for extending the cold phase of the heat absorber when the ice bank about the heat absorber diminishes below the desirable size, and for terminating the extended cold phase of the operation of the heat absorber when the ice bank has been re-established to the desired size.

A further object of this invention is to provide control apparatus for a refrigerating system, such as that described above, in which the control apparatus is normally operative to control the system to start and stop the cooling phases of the refrigerating cycle, solely in response to a predetermined temperature of the heat absorber and having thermostatic means for preventing the stopping of the cooling phase of the cycle of the apparatus when the ice bank about the absorber diminishes beyond that desired.

A still further object of the present invention is to provide a control for starting and stopping the cooling operation of an electrically operated refrigerating system which comprises a device, responsive to the temperature of the heat absorber of a refrigerating system which actuates a switching member in response to predetermined high and low temperature limits of the absorber while it is immersed in the liquid in the tank and a second device responsive to the temperature, approximating the freezing temperature of the liquid in the tank, for arresting the movement of the switching member in the switch opening direction if too much ice is melted off of the evaporator, the arresting continuing until the ice bank has been re-established to that amount desired.

Other and further objects and advantages will be apparent from the following description, reference being had to the accompanying drawing wherein a preferred embodiment of the present invention is clearly shown.

In the drawing:

Fig. 1 is a diagrammatic view of a refrigerating system and a control therefor, the control being shown in the position that it assumes when the cooling phase is to be extended due to the fact that ice bank is too small and the heat absorber itself is above the temperature at which it functions normally to interrupt the electrical circuit and stop the refrigerating cooling phase;

Fig. 2 is a diagrammatic view of the control showing the same in a position in which the heat absorber has been cooled to the temperature at which normally the control functions to interrupt the electrical circuit, the controller being shown as being arrested in its circuit opening position due to the fact that ice bank is too small;

Fig. 3 is a view similar to Fig. 2 but showing the position of the control when the switch is open; and Fig. 4 is a fragmentary sectional view taken on line 4—4 of Fig. 1.

The broad principles embodied in the present invention are disclosed in the patent to R. E. Raney No. 2,266,799, issued December 23, 1941, and the control per se is fully disclosed in the patent to E. D. Raney No. 2,337,926, issued December 28, 1943.

Referring to the accompanying drawing, a tank is shown at 20 which may be of the type for containing liquid such as water in which a series of milk cans 21 are wholly or partly immersed. The liquid level is indicated by the lines 22.

It is desirable to maintain an ice bank in the liquid so as to accommodate peak loads, for example, when a large number of cans of milk are placed in the tank. To accomplish this, the heat absorber 24 is immersed in the liquid and is maintained below the freezing point of the liquid so as to form the ice bank thereabout. Any type of ice making refrigerating system including a heat absorber may be employed, and in the present illustration, the heat absorber is in the form of an evaporation 24 which comprises preferably a plate 25 having refrigerating coil 26 suitably secured thereto.

Gaseous refrigerant is withdrawn from the coil 26 through a pipe 28 to the low pressure side 29 of a compressor 30. The compressed refrigerant is delivered by a pipe 31 to a condenser 32 and a receiver 33, whence it is conducted by a pipe 34 to a pressure reducing device 35 and from the pressure reducing device to the coil 26 by a pipe 36. Any suitable type of pressure reducing device may be employed and the device herein shown is what is known as a thermostatically controlled expansion valve which is not only responsive to pressure within the coil 26, but is also responsive to the temperature at the outlet of the coil 26 for the purpose of preventing liquid refrigerant returning to the low pressure side of the compressor. The thermostatic bulb 38 is connected to the outlet of the coil 26 and this bulb 38 is connected to the expansion valve 35 by a small diameter tube 39.

The compressor may be controlled in any suitable manner and is herein shown as driven by an electric motor 41 through pulley 42, belt 43 and pulley 44. The circuit for the motor may be traced as follows: wire 46, stationary contact 47, movable contact 48, stationary contact 49, wire 50, motor 41, and wire 51.

Two thermostatic systems are employed for controlling the operation of the motor 41. One of these thermostatic systems 53 includes a bellows 54, a small diameter tube 55 and a bulb 56. The bulb 56 is clamped tightly against a portion of the evaporator by a suitable clamp 57 so that the temperature of the bulb 56 approximates the temperature of the plate 25. The other thermostatic system 59 includes a bellows 60, a small diameter tube 61 and a bulb 62. By referring to Fig. 4, it will be seen that the bulb 62 is spaced from the plate 25 of the evaporator 24. Both systems 53 and 59 contain volatile fluid for the purpose of expanding and contracting the bellows 54 and 60 in response to increase and decrease in temperature of the bulbs 56 and 62, respectively.

The switch for actuating the movable contact 48 is of the snap acting type and comprises a lever 64 which carries the movable contact 48. Swinging movement of the lever 64 is confined between contacts 47, 49 and a stop 65. The upper end of this lever is provided with a knife edge bearing which bears in the V notch of a stationary bearing 66. Lever 64 is provided with an upright extension 67 having a downwardly extending knife edge bearing 68 at the top thereof which bears in the V notch 70 of a downwardly extending lever 71. Lever 71 carries two fingers 72 and 73 which straddle the lever 64. The lower end of a coil spring 75 is connected to the lever 71 intermediate the bases of fingers 72 and 73 and the upper end of the spring is connected with a lever 76. Lever is fulcrumed on a stationary pin 77 and is constantly urged toward the right by a spring 79 which is anchored at 80. Elements 64, 67, 71 and springs 75 form a snap acting mechanism for contact 48 and these parts are held in cooperative position by the tension imparted thereto by said spring.

Movement of the lever to the right is arrested, at times, by either of two abutments 81 and 82. When the movement of the lever 76 to the right is not arrested by abutments 81 and 82, lever 76 will be moved by spring 79 to the right so that the upper part of the spring 75 will move the snap acting mechanism beyond its dead center position to quickly separate contact 48 from contacts 47 and 49. Obviously, when the switch is open and the lever 76 is moved to the left, a predetermined distance, the snap acting mechanism will quickly close contact 48 upon contacts 47 and 49.

When the load conditions on the refrigerating system are most favorable, abutment 81 will be retracted to the position shown in Fig. 3 under which condition the spring 79 can move the lever 76 to switch opening position. It will also be noted that at this time the abutment 82 is retracted for the free operation of lever 76. The abutment 82 is moved to and fro by a lever 84 which is also pivoted at 77, the abutment 82 being carried by an arm 83 on the lever. The movable end of the bellows 54 carries a pin 85 which is arranged to move the lever 84 and abutment 82 in a counterclockwise direction, upon expansion of the bellows, so as to move the switch operating lever 76 to the left. Counterclockwise movement of the lever 84 by the bellows 54 is counteracted by a spring 87. The tension of this spring 87 can be regulated by a screw 88 so as to adjust the pressure at which the bellows 54 cause closing action of the switch. The head of the screw 88 abuts a stationary plate 90 and the shank of the screw is threaded into a spring retaining plate 91. The head of screw 88 carries an adjusting knob 93. By increasing the pressure on the spring 87, higher pressure must be attained in bellows 54 before it can move lever 76 to switch closing position and likewise a higher pressure must be attained in the bellows 54 before the switch opens than when a lesser tension is applied by the spring 87. Conversely, by decreasing the tension of spring 87, the switch will be opened in response to lower pressures in the bellows. Due to the construction of the snap acting mechanism, a differential in pressure is necessary in the bellows between the opening and closing of the switch. Under normal conditions or most favorable conditions, in which the abutment 81 does not arrest the movement of the lever 76, the starting and stopping of the compressor motor are controlled solely by the thermostatic system 53. That is, when the temperature of the evaporator 24 attains a predetermined high value, the circuit to the motor will be closed and when the temperature of the evaporator has been decreased to a predetermined low temperature, the circuit to the motor is interrupted. When water is contained within the tank 20, the spring 87 is adjusted so that the switch closes the motor circuit when the temperature of the evaporator attains 28° F. and interrupts the circuit to the motor when the temperature of the evaporator is at approximately 25° F. In this manner an ice bank is maintained about the evaporator 24.

In the event of an abnormal or peak load on the ice bank, as for example, when water is being used and warm water is being delivered to the tank, or in the event that a large number of milk cans are placed within the tank, the ice, indicated at 103 in Fig. 4, begins to melt and the temperature of bulb 62 will rise. This increase in temperature at the bulb 62 will cause expansion of bellows 60, causing the abutment 81 to be moved to the position shown in Fig. 1. Abutment 81 is carried by an arm 94 of a lever 95. This lever 95 is pivoted on a stationary pin 96. A pin 98 on the bottom side of bellows 60 engages the arm 99 of lever 95 and normally tends to turn lever 95 in a clockwise direction. The extent of clockwise movement of the lever 90 is arrested by a stop 100. A spring 102 imparts a counteracting force to the bellows 60. The tension of this spring 102 can be adjusted in the same manner as defined with respect to spring 87.

From the foregoing it can be seen that when the temperature of the bulb 62 is above a predetermined temperature, the bellows 60 will have moved the abutment 81 into the path of movement of the lever 76 as shown in Figs. 1 and 2. Under this condition, the lever 76 cannot move the snap acting mechanism to the circuit interrupting position thereof and, consequently the cooling phase of the refrigerating cycle will continue until this condition is alleviated. At this time, the control is in the position shown in Fig. 2. The spring 79 is insufficient to overcome the pressure exerted by the bellows 60. It will also be observed, from Fig. 2, that the temperature of the evaporator has decreased to below the temperature at which, normally, the spring 87 and spring 79 open the circuit of the motor. Levers 84 and 76 being separate elements, bellows 54 may contract without affecting the condition imposed by the bellows 60. This is also clearly shown in Fig. 2 wherein the abutment 82 has been removed from engagement with the lever 76. The refrigerator compressor will continue to operate until the ice bank increases so as to contact or approach contacting of bulb 62, at which time, the temperature of the bulb 62 will be decreased sufficiently to cause a sufficient recession in the pressure in bellows 60 so as to permit the spring 102 to move the lever 95 in a counterclockwise direction and remove the abutment 81 from arresting position. This permits clockwise movement of the lever 76. After the lever 95 has moved a predetermined distance in a counterclockwise direction, carrying with it the abutment 81, the spring 79 will move the lever 76 to impart a snap acting opening movement to the snap switch whereby the circuit to the motor is interrupted.

By reason of the present invention, a relatively small compressor and driving motor only are necessary since ice can be stored or manufactured and stored during periods of small demands and this ice together with the refrigerating effect of the evaporator during the operation of the compressor are sufficient to satisfy the expected peak loads. In the preferred embodiment, the type of evaporator employed is one in which only a relatively small amount of liquid refrigerant space is provided in the evaporator as distinguished from the so called "flooded type." The reason for this is that when only a small amount of liquid refrigerant is contained in the evaporator, the temperature thereof rises quickly during the period of idleness of the compressor and in this manner the compressor is started and stopped more often with the result that the heat load affects the temperature of the evaporator quickly and consequently the starting of the compressor is sensitive to the immediate heat load upon the refrigerating system.

While the form of embodiment of the present invention as herein disclosed constitutes a preferred form, it is to be understood that other forms might be adopted, all coming within the scope of the claims which follow.

I claim:

1. A refrigerating system, comprising in combination, a tank containing liquid; a heat absorber disposed in said liquid; means for supplying a cooling fluid to the heat absorber in response to a predetermined temperature of the absorber and for terminating the supply of cooling fluid flowing to the absorber in response to a lower temperature of the heat absorber, said lower temperature being below the freezing point of the liquid; and means disposed within the liquid and spaced from the heat absorber and responsive to the temperature of the liquid at the spaced point from the heat absorber for preventing termination of the supply of cooling fluid flowing to said absorber until the temperature of the liquid at said point is lowered to a temperature approximating freezing temperature of the liquid.

2. The method of operating a refrigeration system, including a heat absorber immersed in a body of a normally liquid medium and a circulator connected to said absorber to supply refrigerant thereto, said method comprising controlling the operation of said circulator by variations in the temperature of said absorber as long as the medium, at a predetermined point spaced from the heat absorber, is in the solid phase and causing the presence of the medium in liquid phase at said point to cause operation of the circulator until the liquid is converted at said point into the solid phase.

3. The method of operating a refrigerating system, including a heat absorber through which a refrigerant is circulated and which heat absorber is immersed in a body of normally liquid medium, said method comprising controlling the cooling function of circulating refrigerant on the heat absorber in response to variations in temperature of said absorber as long as the medium, at a predetermined point spaced from the heat absorber, is in the solid phase and causing the presence of the medium in liquid phase at said point to increase the cooling function of the refrigerant on the absorber until the liquid is converted at said point into the solid phase.

4. A refrigerating system, comprising in combination, a tank containing a body of normally liquid medium; a heat absorber disposed in said medium; means for circulating a cooling fluid through the heat absorber; and control means for controlling the cooling function of the circulating cooling fluid on the heat absorber in response to variations in temperature of said absorber as long as the medium, at a predetermined point spaced from the heat absorber, is in the solid state, said control means including means responsive to the temperature of the medium at said point, when the medium is in liquid phase, for increasing the cooling function of the cooling fluid on the heat absorber until the medium is converted at said point into a solid phase.

ESTEL C. RANEY.

No references cited.